United States Patent [19]
Tsubouchi

[11] Patent Number: 5,839,344
[45] Date of Patent: Nov. 24, 1998

[54] VACUUM SERVO UNIT FOR A VEHICLE BRAKING SYSTEM

[75] Inventor: Kaoru Tsubouchi, Toyota, Japan

[73] Assignee: Aisin Seiki Kabushiki Kaisha, Kariya, Japan

[21] Appl. No.: 806,670

[22] Filed: Feb. 26, 1997

[30] Foreign Application Priority Data

Feb. 26, 1996 [JP] Japan ..................................... 8-038436

[51] Int. Cl.⁶ ...................................................... F15B 9/10
[52] U.S. Cl. ........................................................ 91/376 R
[58] Field of Search ............................... 91/376 R, 369.2

[56] References Cited

U.S. PATENT DOCUMENTS

| | | | |
|---|---|---|---|
| 4,535,679 | 8/1985 | Kytta | 91/376 R |
| 5,546,846 | 8/1996 | Bauer . | |

FOREIGN PATENT DOCUMENTS

| | | | |
|---|---|---|---|
| 2116270 | 9/1983 | United Kingdom | 91/369.2 |

*Primary Examiner*—F. Daniel Lopez
*Attorney, Agent, or Firm*—Burns, Doane, Swecker & Mathis, LLP

[57] ABSTRACT

A vacuum servo unit includes a movable power piston having a base portion and a cylindrical portion whose output side end portion is connected to the input side end portion of the base portion. The base portion has an annular first projection projecting into the inside of the cylindrical portion and a second projection projecting into the inside of the cylindrical portion. the second projection divides the space surrounded by the annular first projection into a first space and a second space. A vacuum path communicates the constant pressure chamber with the first space, and an air path communicates the variable pressure chamber with the second path. Thus, the area of the cross-section of the second space in a plane perpendicular to the axis of the movable power piston can be enlarged so that atmospheric air can smoothly flow into the variable pressure chamber.

17 Claims, 14 Drawing Sheets

VACUUM SERVO UNIT FOR A VEHICLE BRAKING SYSTEM

FIELD OF THE INVENTION

The present invention relates to vehicle braking systems or clutch systems and more particularly concerns a vacuum servo unit for a vehicle braking system or a clutch system.

BACKGROUND OF THE INVENTION

A conventional vacuum servo unit for a vehicle is disclosed in German Patent Laid-Open Publication No. DE 42 27 879 A1 after examination. This vacuum servo unit includes a housing in which is defined a pressure chamber, a movable wall member provided in the housing or dividing the pressure chamber into a constant pressure chamber communicated with a negative pressure source and a variable pressure chamber selectively communicated with the atmosphere and the constant pressure chamber, a movable power piston integrally connected with the movable wall member, an input member provided in the movable power piston and axially movable upon brake actuation, and an output member which outputs a propulsion force generated by the movable power piston accompanying the movement of the movable wall member. A control member selectively communicates the variable pressure chamber with the constant pressure chamber or with the atmosphere according to the movement of the input member against the movable power piston. The movable power piston has a base portion and a cylindrical portion whose output side end portion is connected to an input side end portion of the base portion. The base portion has an annular projection projecting into the inside of the cylindrical portion. A vacuum path communicates the constant pressure chamber with a first space between the annular projection and the inner peripheral portion of the cylindrical portion. An air path communicates the variable pressure chamber with a second space surrounded by the annular projection. The input member is disposed in the base portion and the control member is disposed in the cylindrical portion. The control member contacts the annular projection to cease communication between the first space and the second space, and moves away from the annular projection to communicate the first space with the second space. The input member contacts the control member to cease communication between the second space and the atmosphere, and moves away from the control member to communicate the second space with the atmosphere.

In this vacuum servo unit, the input member is moved by brake actuation so that the control member contacts the annular projection and the input member moves away from the control member. The control member contacts the annular projection, which cuts off communication between the first space and the second space, i.e., cuts off communication between the constant pressure chamber and the variable pressure chamber. The input member brakes away from the control member which communicates the second space with the atmosphere, i.e., communicates the variable pressure chamber with the atmosphere. Therefore, a pressure differential is generated between the variable pressure chamber and the constant pressure chamber and this pressure differential acts on the movable wall member, the movable power piston, and the output member.

However, in the foregoing vacuum servo unit, because the first space surrounds the second space, i.e., the second space is located inside of the first space, the cross-sectional area of the second space in a plane perpendicular to an axis of the movable power piston is not sufficiently enlarged. Thus, atmospheric air does not smoothly flow into the second space, the air path, and the variable pressure chamber.

SUMMARY OF THE INVENTION

Accordingly, a need exists for a vacuum servo unit that is able to obviate the aforementioned drawback associated with the conventional vacuum servo unit. That is, a need exists for a vacuum servo unit which allows atmospheric air to flow into the air path and the variable pressure chamber smoothly.

In light of the foregoing, one aspect of the present invention involves a vacuum servo unit for a vehicle braking system that includes a housing in which a pressure chamber is defined. A movable wall member is disposed in the housing to divide the pressure chamber into a constant pressure chamber adapted to communicate with a negative pressure source and a variable pressure chamber adapted to selectively communicate with atmosphere or with the constant pressure chamber. A movable power piston is integrally connected with the movable wall member and has a base portion and a cylindrical portion whose output side end portion connected to an input side end portion of the base portion. The base portion has an annular projection projecting into the inside of the cylindrical portion and dividing a space surrounded by the annular projection into first and second spaces. A vacuum path communicates the first space with the constant pressure chamber. An air path communicates the second space with the variable pressure chamber. An input member is disposed in the base portion and axially movable on brake actuation. An output member outputs a propulsion force generated by the movable power piston accompanying the movement of the movable wall member. A control member is disposed in the cylindrical portion and cooperates with the projections and the input member to selectively communicate the second space with the first spice or with the atmosphere according to a movement of the input member with respect to the movable power piston.

In accordance with the present invention, because the second space is not entirely surrounded by the first space, the cross-sectional area of the second space in a plane perpendicular to the axis of the movable power piston can be sufficiently enlarged. Thus, the atmospheric air can flow into the second space, the air path, and the variable pressure chamber smoothly.

According to another aspect of the present invention, a vacuum servo unit for a vehicle braking system includes a housing in which is defined a pressure chamber, a movable wall member disposed in the housing for dividing the pressure chamber into a constant pressure chamber communicable with a negative pressure source and a variable pressure chamber selectively communicable with atmosphere and the constant pressure chamber, and a movable power piston connected with the movable wall member. A negative pressure controlling valve seat defines within the movable power piston a first space and a second space. The first space is separate from said second space and has an annular extent less than the annular extent of the second space. A vacuum path communicates the first space with the constant pressure chamber and an air path communicates the second space with the variable pressure chamber. An input member is disposed in the movable power piston and is axially movable upon brake actuation and an output member outputs a propulsion force generated by the movable power piston according to movement of the movable wall member. A control member is disposed in the movable power piston.

The control member is selectively engageable with and disengageable from the negative pressure controlling valve seat during axial movement of the input member with respect to the movable power piston to communicate the variable pressure chamber with the constant pressure chamber by way of the first and second spaces when the control member is out of engagement with the negative pressure controlling valve seat and to cease communication between the constant pressure chamber and the variable pressure chamber while communicating the variable pressure chamber with the atmosphere by way of the second space second space when the control member is in engagement with the negative pressure controlling valve seat.

In accordance with another aspect of the present invention, a vacuum servo unit for a vehicle braking system includes a housing in which is defined a pressure chamber, a movable wall member disposed in the housing for dividing the pressure chamber into a constant pressure chamber communicable with a negative pressure source and a variable pressure chamber selectively communicable with the atmosphere and the constant pressure chamber, a movable power piston connected with the movable wall member, and a negative pressure controlling valve seat disposed in the movable power piston. The negative pressure controlling valve seat divides the space within the movable power piston into a first space and a second space. A vacuum path communicates the first space with the constant pressure chamber, and an air path communicates the second space with the variable pressure chamber. An input member is disposed in the base portion and is axially movable upon brake actuation, and an output member outputs a propulsion force generated by the movable power piston according to movement of the movable wall member. A control member is disposed in the cylindrical portion for cooperating with the negative pressure controlling valve seat to selectively communicate the second space with the first space or with the atmosphere according to movement of the input member with respect to the movable power piston. The movable power piston is provided with a communicating path which constantly communicates the second space with the third space.

BRIEF DESCRIPTION OF THE DRAWING FIGURES

The foregoing and other features will become more readily apparent from the following description of the invention considered with reference to the accompanying drawing figures in which the like elements are designated by like reference numerals and wherein.

DETAILED DESCRIPTION OF THE PREFERRED EMBODIMENTS

Figure 1:
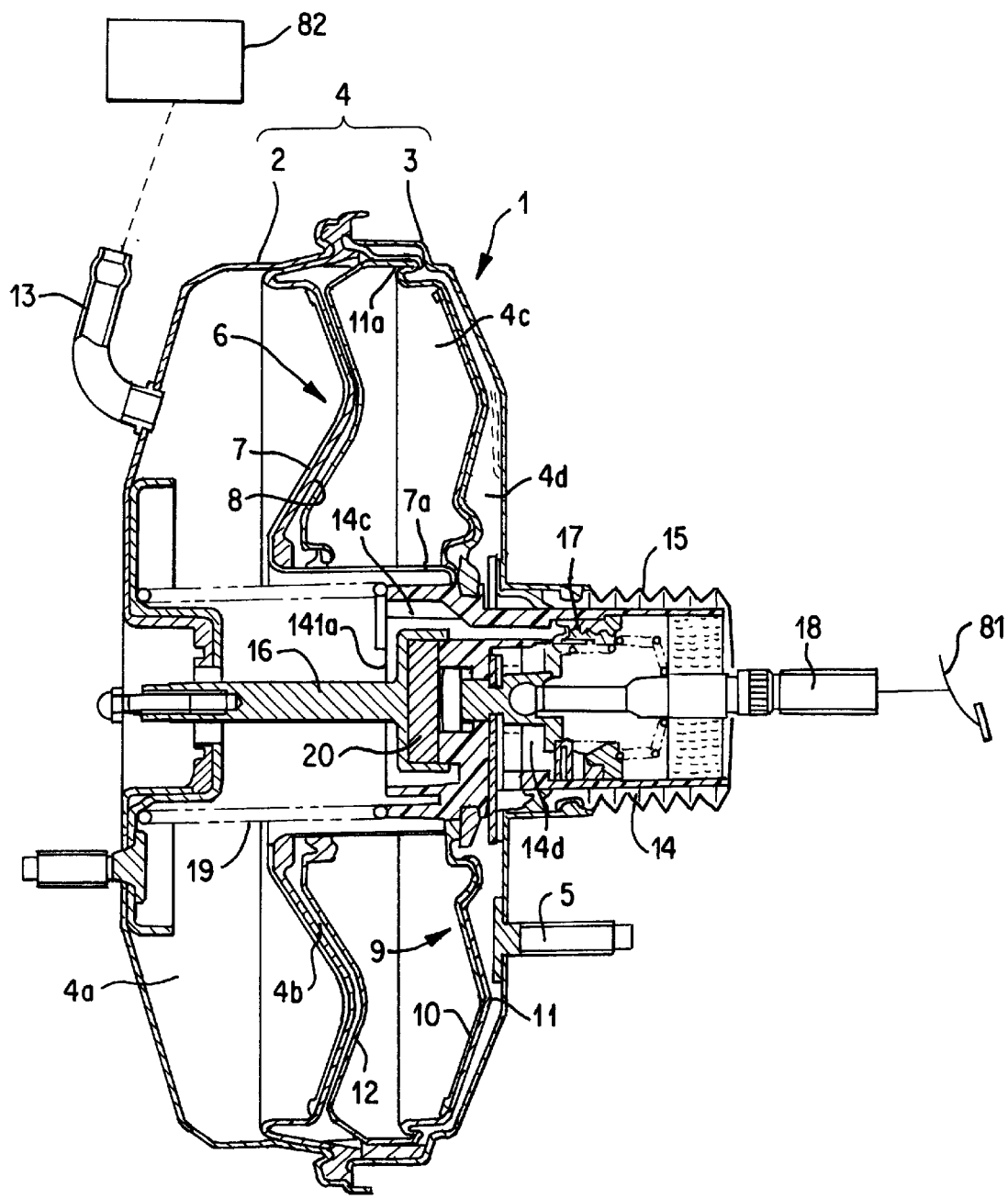
FIG. 1 is a cross-sectional view of a vacuum servo unit according to a first embodiment of the present invention.

FIG. 1 illustrates a vacuum servo unit according to a first embodiment of the present invention. In FIG. 1 the vacuum servo unit 1 has a housing 4 defined by a front shell 2 and a rear shell 3. A pressure chamber is defined within the interior of the housing. The vacuum servo unit 1 also includes a plurality of stud bolts 5 installed at regular intervals on the rear shell 3 in the peripheral direction. The stud bolts 5 are adapted to be inserted through the dash panel (not shown) of a vehicle to fix the vacuum servo unit 1 to the vehicle.

A partition wall member 12 is disposed in the pressure chamber of the housing 4 to divide the pressure chamber into a front pressure chamber and a rear pressure chamber. A front movable wall member 6 is disposed in the front pressure chamber on the left side of a partition wall member 12 in the housing 4 as seen with reference to FIG. 1. The front movable wall 6 divides the front pressure chamber in an air tight manner into a Front constant negative pressure chamber 4a and a front variable pressure chamber 4b.

A rear movable wall member 9 is disposed in the rear pressure chamber on the right side of the partition wall member 12 in the housing 4 as seen with reference to FIG. 1. The rear movable wall member 9 divides the rear pressure chamber in an air tight manner into a rear constant negative pressure chamber 4c and a rear variable pressure chamber 4d, Thus, these chambers 4a, 4b, 4c, 4d are divided by way of the partition wall member 12, the front movable wall member 6, and the rear movable wall member 9.

The front movable wall member 6 has a front plate 7 and a front diaphragm 8. The outer peripheral end portion of the front diaphragm 8 is fixed between the front shell 2 and the rear shell 3. The rear movable wall member 9 has a rear plate 10 and a rear diaphragm 11. The outer peripheral end portion of the partition wall member 12 is sandwiched between the front diaphragm 8 and the rear shell 3. The outer peripheral end portion of the rear diaphragm 11 is sandwiched between an outer peripheral bent portion of the partition wall member 12 and a stepped portion of the rear shell 3. Therefore, the partition wall member 12 is fixed in the housing 4.

Several communicating holes (not specifically shown) are disposed at regular intervals on the outer peripheral portion of the partition wall member 12 in the peripheral direction. Several communicating passages 11a, one of which is illustrated in FIG. 1, are disposed at regular intervals on the outer peripheral portion of the rear diaphragm 11 in the peripheral direction. The communicating passages 11a are L-shaped. The communication between the front variable pressure chamber 4b and the rear variable pressure chamber 4d is permitted at all times by the communicating holes and the communicating passages 11a.

Several air holes 7a, one of which is shown in FIG. 1, are disposed at regular intervals on the inner cylindrical portion of the front plate 7 in the peripheral direction. The air holes 7a maintain communication between the front constant pressure chamber 4a and the rear constant pressure chamber 4c. The front constant pressure chamber 4a is adapted to communicate with a negative pressure source 82 such as an intake manifold of an internal combustion engine through an inlet 13 provided on the front shell 2, so that the front constant pressure chamber 4a and the rear constant pressure chamber 4c constantly generate or are under negative pressure.

A movable power piston 14 is inserted in the housing 4 from the open end portion of the rear shell 3. A cover 15 is disposed on the outer peripheral portion of the movable power piston 14 to prevent dust and the like from entering into the housing 4. An output rod 16 is disposed in front of the movable power piston 14, and the output rod 16 extends through the front shell 2 to engage with a piston of the master cylinder (not shown).

A control valve mechanism 17 is disposed in the movable power piston 14. The control valve mechanism 17 cooperates with a brake operation member 81, e.g., a brake pedal, through an input rod 18 extending from an inside of the movable power piston 14 to an outside of the movable power piston 14. In an initial state shown in FIG. 1, the control valve mechanism 17 permits communication between the constant pressure chambers 4a, 4c and the variable pressure chamber 4b, 4d and cuts off communication between the variable pressure chambers 4b, 4d and the atmosphere in a retracted state of the brake pedal 81. When the brake pedal 81 is depressed, the input rod 18 is moved towards the output side, i.e., to the left in FIG. 1, so that the control valve mechanism 17 is operated to cut off communication between the constant pressure chambers 4a, 4c and the variable pressure chambers 4b, 4d and communicate the variable pressure chambers 4b, 4d with the atmosphere. Thus, in response to depression of the brake pedal 81, atmospheric air is introduced to the variable pressure chambers 4b, 4d.

Figure 2:
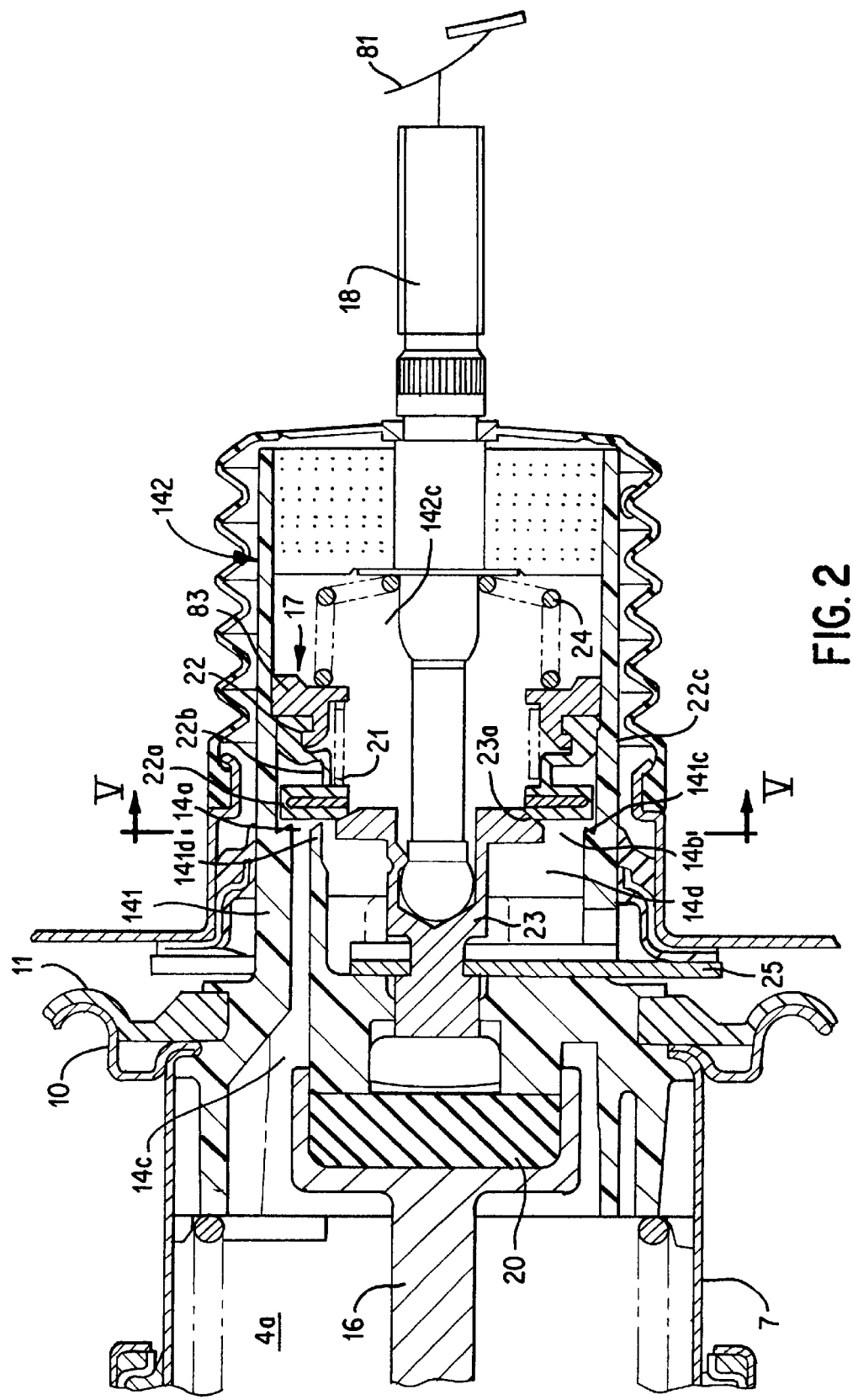
FIG. 2 is a partly enlarged cross-sectional view of the portion of the vacuum servo unit shown in FIG. 1 located near the control valve mechanism.
Figure 3:
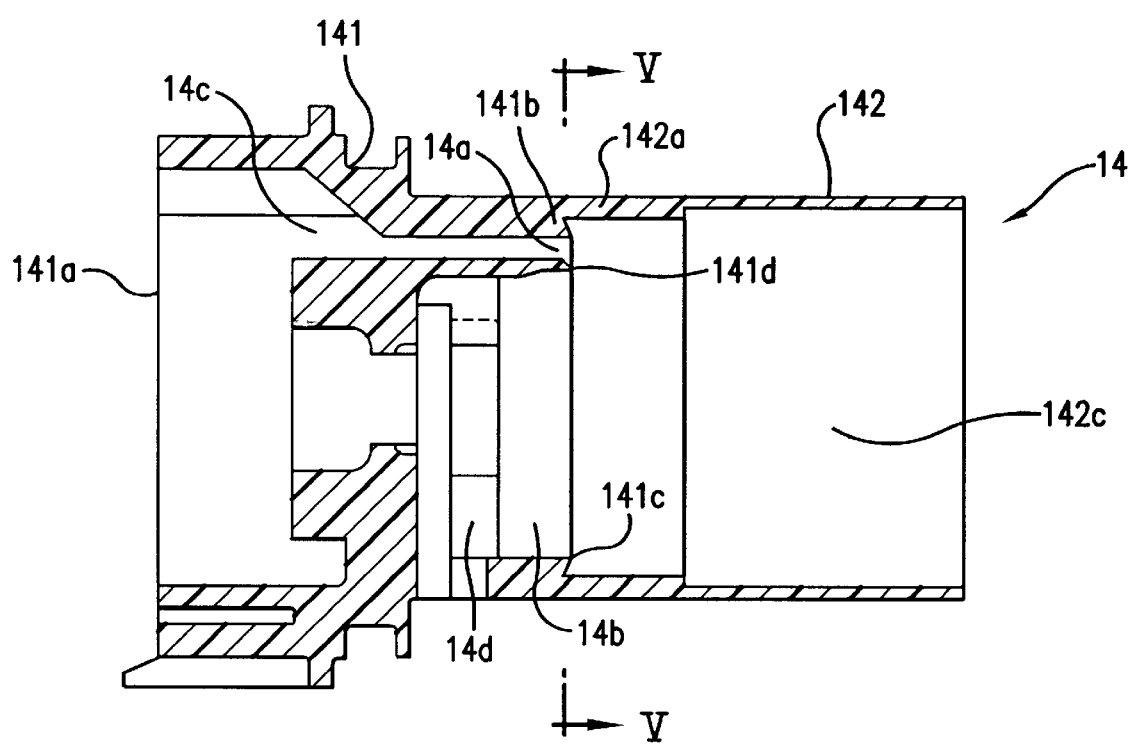
FIG. 3 is a partly enlarged cross-sectional view of the movable power piston used in the vacuum servo unit shown in FIG. 1.

As seen in FIG. 2, the control valve mechanism 17 includes a control valve 22, projections 141c, 141d which serve as a negative pressure controlling valve seat, and an atmosphere controlling valve seat 23a formed on an input member 23. As shown in FIG. 3, the movable power piston 14 has a base portion 141 and a cylindrical portion 142 whose output side end portion 142a is connected to or extends from the input side end portion 141b of the base portion 141.

Figure 4:
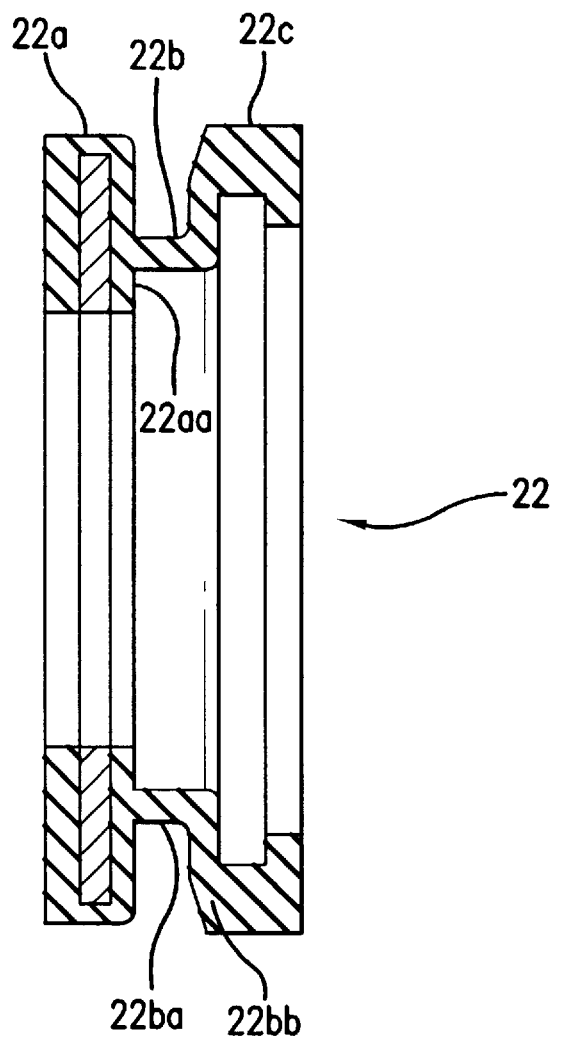
FIG. 4 is a partly enlarged cross-sectional view of the control valve used in the vacuum servo unit shown in FIG. 2.

As seen with reference to FIG. 2 and FIG. 4, the control valve 22 is disposed in the cylindrical portion 142 of the movable power piston 14 and has a annular seal portion 22a, a cylindrical extensible portion 22b whose output side end portion 22ba is connected to an inner peripheral portion 22aa of the annular seal portion 22a, and an engaging portion 22c connected to the input side end portion 22bb of the cylindrical extensible portion 22b. The engaging portion 22c is sandwiched between the inner peripheral portion of the cylindrical portion 142 and a support member 83 positioned within the cylindrical portion 142 of the movable power piston 14. In this way, the control valve 22 is secured in the cylindrical portion 142 of the movable power piston 14.

FIG. 2 shows that a second spring 21 is disposed between the seal portion 22a of the control valve 22 and the support member 83 to bias the seal portion 22a towards the output side, i.e, towards the left in FIG. 2 and towards the projections 141c, 141d.

The input member 23 is disposed in the base portion 141 of the movable power piston 14. As noted above, the input side end portion of the input member 23 is provided with the atmosphere controlling valve seat 23a. The input rod 18 whose an input side end portion is connected with a brake pedal 81, is located in the movable power piston 14. The output side end portion of the input rod 18 is connected with the input member 23 so that the two are capable of moving together as a unit. The movement of the input member 23 against the movable power piston 14 is restricted to a preset value by a key member 25. A first spring 24 is disposed between the support member 83 and a retainer of the input rod 18 to bias the input rod 18 towards the input side, i.e., towards the right in FIG. 2.

Figure 5:
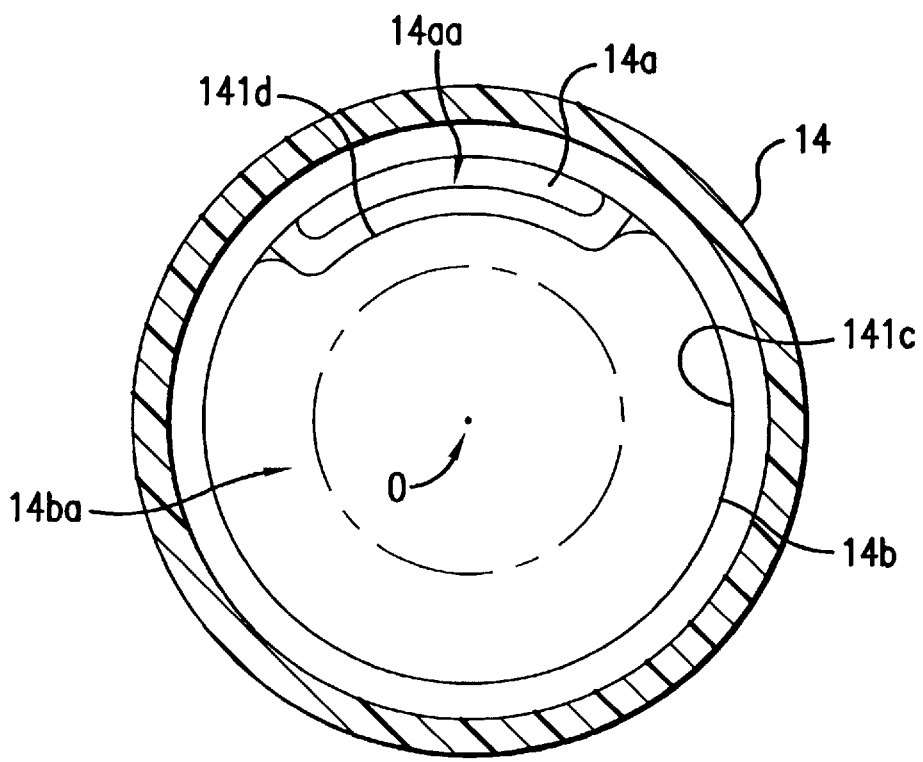
FIG. 5 is a cross-sectional view of the movable power piston shown in FIG. 2 taken along the section line V—V in FIG. 2 and FIG. 3.

FIG. 5 shows a cross-section of the movable power piston 14 in a plane perpendicular to the axis of the movable power piston 14. In FIG. 5, the one dot chain line shows the engaging portion of the atmosphere controlling valve seat 23a against the seal portion 22a. As seen particularly with reference to FIGS. 2, 3 and 5, the base portion 141 of the movable power piston 14 has an annular projection 141c projecting into the inside space 142c of the cylindrical portion 142 and a projection 141d projecting into the inside space 142c. The projection 141d divides the space surrounded by the annular projection 141c into a first space 14a and a second space 14b. A vacuum path 14c for communicating the front constant pressure chamber 4a with the first space 14a and an air path 14d for communicating the rear variable pressure chamber 4d with the second space 14b are disposed in the base portion 141.

As shown in FIG. 5, a cross-section 14aa of the first space 14a in the plane perpendicular to the axis of the movable power piston 14 is in the form of an arc having a center O corresponding to the axis of the movable power piston 14. The area of the cross-section 14ba of the second space 14b in the plane perpendicular to the axis of the movable power piston 14 is larger than the area of the cross-section 14aa of the first space 14a.

With reference to FIG. 2, the input side end portion of the inner cylindrical portion of the front plate 7 is connected in an air tight manner with the outer peripheral portion of the base portion 141 of the movable power piston 14. The inner peripheral end portions of the rear plate 10 and the diaphragm 7 are connected in an air tight manner with the outer peripheral portion of the base portion 141 of the movable power piston 14. As seen in FIG. 1, the inner peripheral end portion of the front diaphragm 8, is in an air tight manner connected to the inner cylindrical portion of the, front plate 7, and the inner cylindrical portion of the front plate 7 slides with respect to the inner peripheral end portion of the partition wall member 12 in an air tight manner.

FIG. 1 shows that a return spring 19 is disposed between the output side end portion 141a of the base portion 141 of the movable power piston 14 and the front shell 2 to bias the movable power piston 14 towards the rear shell 3, i.e., towards the right in FIG. 1. A reaction disc 20 is disposed between the movable power piston 14 and the output rod 16.

Having described the various features associated with a first embodiment of the vacuum servo unit of the present invention, its operation will now be described with reference to FIGS. 1–5. In an initial state shown in FIG. 2, the front constant pressure chamber 4a is communicated with the rear variable pressure chamber 4d through the vacuum path 14c, first space 14a, the clearance between the seal portion 22a and the projections 141c, 141d, the clearance between the outer peripheral portion of the input member 23 and the projections 141c, 141d, i.e., the second space 14b, and the air path 14d.

When the brake pedal 81 is actuated by the driver, the input rod 18 connected with the brake pedal 81 receives the brake operation force and moves towards the left as seen in FIG. 2. The input member 23 fixed to the input rod 18 moves integrally with the input rod 18 towards the left in FIG. 2. The seal portion 22a of the control valve 22 also moves towards the left according to the movement of the input member 23 by virtue of the biasing force of the second spring 21. The seal portion 22a of the control valve 22 then contacts the projections 141c, 141d on the movable power piston 14 which cuts off communication between the first space 14a and the second space 14b, i.e., communication between the constant pressure chambers 4a, 4c and the variable pressure chambers 4b, 4d ceases. Therefore, communication between the variable pressure chambers 4b, 4d and the negative pressure source 82 is cut off.

As the input member 23 moves further towards the left in FIG. 2, the engagement between the atmosphere controlling valve seat 23a and the seal portion 22a ceases so that the second space 14b communicates with the atmosphere, i.e., the variable pressure chamber; 4b, 4d communicate with the atmosphere. This communication is effected through the air path 14d, the clearance between the outer peripheral portion of the input side portion of the input member 23 and the projections 141c, 141d (i.e., the second space 14b), the clearance between the atmosphere controlling valve seat 23a and the seal portion 22a, and the inside space 142c of the cylindrical portion 142a of the movable power piston 14. Therefore, a pressure differential is generated between the constant pressure chambers 4a, 4c and the variable pressure chambers 4b, 4d by the inflow of atmosphere air into the variable pressure chambers 4b, 4d. The movable wall members 6, 9 receive the load force created by the pressure differential, and the movable power piston 14 connected with the movable wall member 6, 9 supplies the amplified brake force to the output rod 16 through the reaction disc 20. The output rod 16 outputs a propulsion force generated by the movable power piston 14, i.e., the amplified brake force is supplied to outside the vacuum servo unit 1.

When the driver determines that there is no need for a brake operation and the brake pedal 81 is returned to its non-actuated state, the input member 23 moves towards the right in FIG. 2 according to the returning movement of the input rod 18. The atmosphere controlling valve seat 23a contacts the seal portion 22a, which cuts off communication between the second space 14b and the atmosphere, i.e., communication between the variable pressure chambers 4b, 4d and the atmosphere ceases. As the input member 23 moves more towards the right in FIG. 2, the seal portion 22a of the control valve 22 is pushed by the input member 23 to move towards the right in cooperation with the input member 23. Accordingly, the seal portion 22a moves away from the projections 141c, 141d, thus causing communication between the variable pressure chambers 4b, 4d and the constant pressure chambers 4a, 4c. The atmospheric air in the variable pressure chambers 4b, 4d thus flows into the constant pressure chambers 4a, 4c. Therefore, the degree of the aggressive pressure in the variable pressure chambers 4b, 4d decreases and the servo force to the movable power piston 14 decreases. The movable power piston 14 and the input rod 18 are returned to the initial position by the biasing force of the spring 19 and the reaction force from the master cylinder (not shown).

By virtue of the above-described construction of the vacuum servo unit 1 of the present invention, since the second space 14b is not surrounded by the first space 14a (i.e., the annular extent of the first space is less than the annular extent of the second space), the area of the cross-section 14ba of the second space 14b can be larger than the area of the cross-section 14aa of the first space 14a. Since the area of the cross-section 14ba of the second space 14b is larger than that of the cross-section 14aa of the first space 14a, atmospheric air can smoothly flow into the second space 14b, the air path 14c, and the variable pressure chambers 4b, 4d.

In the first embodiment described above, the vacuum servo unit is a tandem-type vacuum servo unit, but it is to be understood that similar advantages can be achieved using the present invention in a single-type vacuum servo unit.

Figure 6:
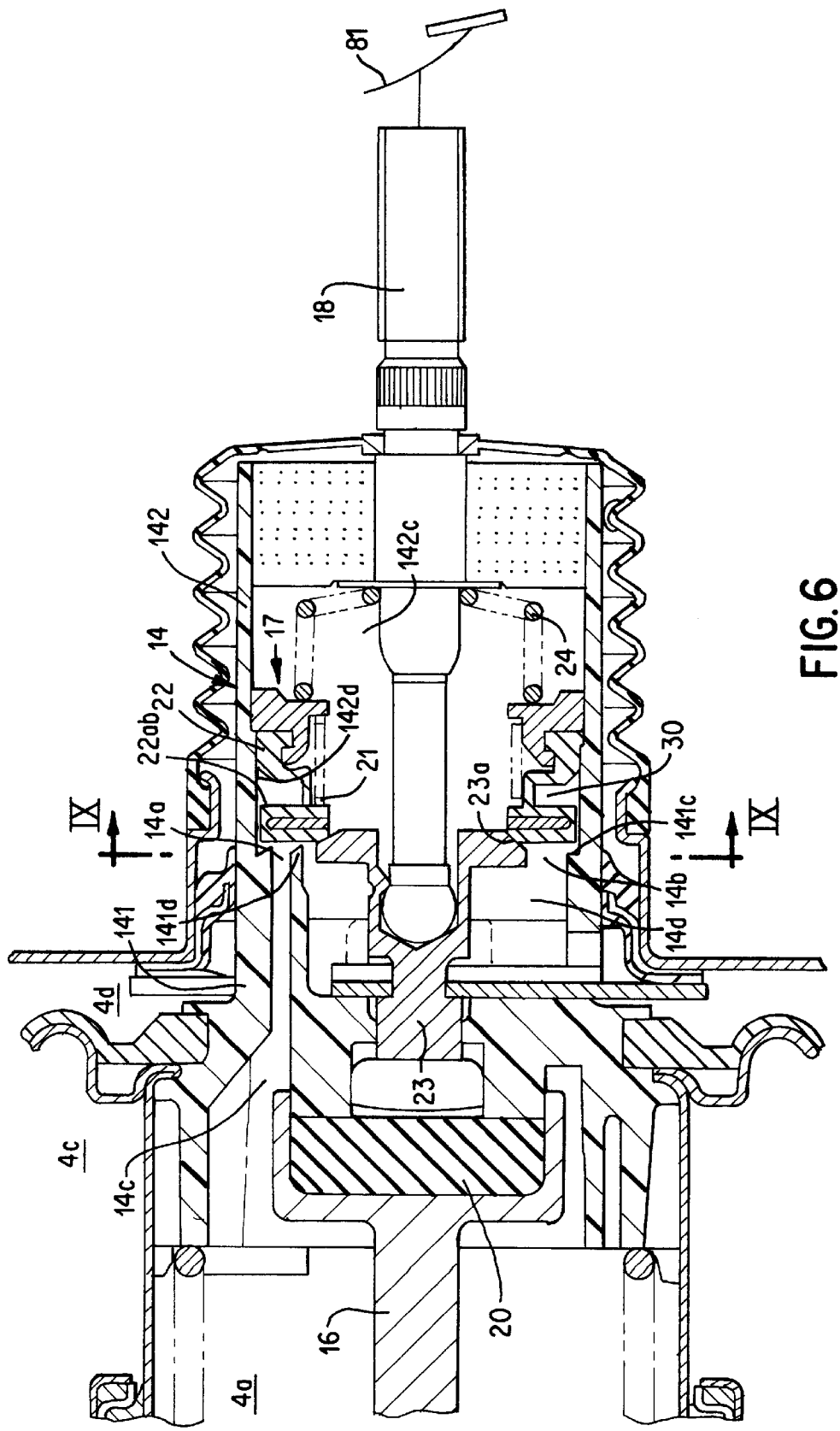
FIG. 6 is a partly cross-sectional view of the portion of the vacuum servo unit located near the control valve mechanism illustrating the movable power piston according to a second embodiment of the present invention.

FIG. 6 illustrates a second embodiment of the vacuum servo unit according to the present invention. Features of the second embodiment that are similar to those in the first embodiment are identified with the same reference numerals. To the extent features in the second embodiment correspond to those in the first embodiment, the description set forth above is incorporated herein by reference and is not repeated. The following description focuses primarily on the differences of the second embodiment relative to the previously described first embodiment.

Figure 7:
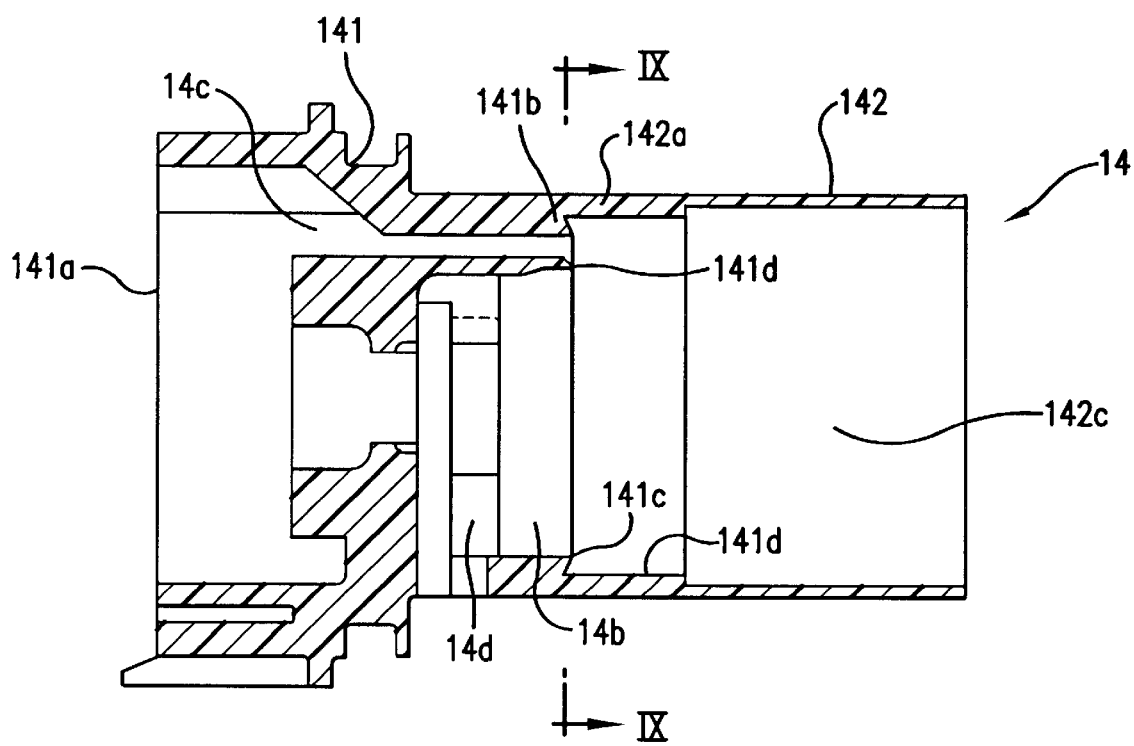
FIG. 7 is a partly enlarged cross-sectional view of the movable power piston shown in FIG. 6.
Figure 8:
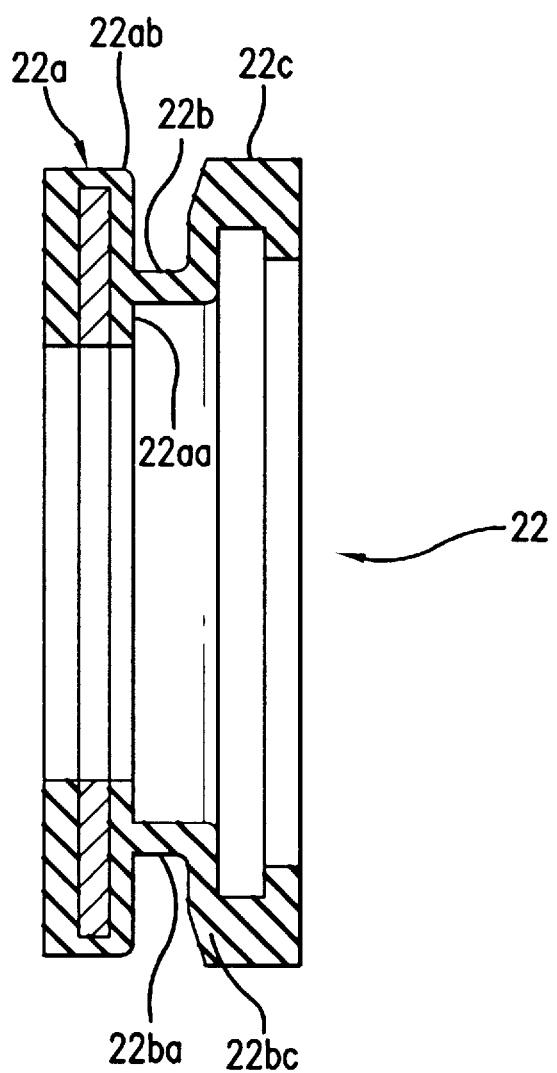
FIG. 8 is a partly enlarged cross-sectional view of the control valve shown in FIG. 6.
Figure 9:
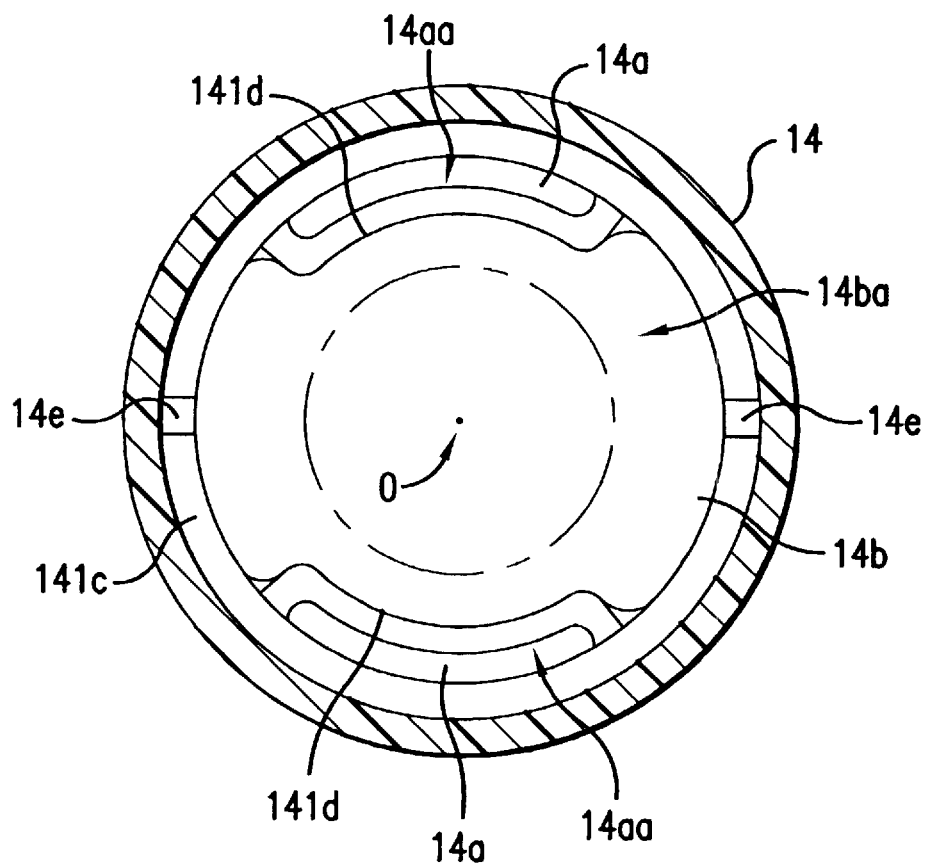
FIG. 9 is a cross-sectional view of the movable power piston along the section line IX—IX FIG. 6 and FIG. 7.

FIG. 9 shows a cross-section of the movable power piston 14 in a plane perpendicular to the axis of the movable power piston 14. In FIG. 9, the one dot chain line shows an indication of the engagement portion of the atmosphere controlling valve seat 23a against the seal portion 22a. Referring to the illustrations in FIG. 6, FIG. 7, and FIG. 9, the base portion 141 of the movable power piston 14 has an annular projection 141c projecting into the inside space 142c of the cylindrical portion 142 of the movable power piston 14 and two projections 141d, 141d projecting into the inside space 142c. The two projections 141d, 141d are circumferentially spaced apart from one another and divide the space surrounded by the annular projection 141c into two first spaces 14a, 14a and a second space 14b. The vacuum paths 14c for communicating the front constant pressure chamber 4a with the first spaces 14a, 14a and an air path 14d for communicating the rear variable pressure chamber 4d with the second space 14b are disposed in the base portion 141 of the movable power piston 14.

The cross-sections 14aa, 14aa of the first spaces 14a, 14a in the plane perpendicular to the axis of the movable power piston 14 are in the shape of an arc having a center O corresponding to the axis of the movable power piston 14. The area of the cross-section 14ba of the second space 14b in the plane perpendicular to the axis of the movable power piston 14 is larger than the total area of the cross-sections 14aa, 14aa of the first spaces 14a, 14a. Also, the annular extent of each of the first spaces 14a, 14a, and indeed the combined annular extent of the two spaces 14a, 14a, is less than the annular extent of the second space.

The first spaces 14a, 14a are located opposite to the seal portion 22a of the control valve 22. Also, the two first spaces 14a, 14a are symmetrically disposed with respect to the center O.

With reference to FIG. 6, a clearance is provided between the outer peripheral end portion 22ab of the seat portion 22a and an inner peripheral portion 142d of the cylindrical portion 142. A third space 30 is formed between the outer peripheral portion of the control valve 22 and the inner peripheral portion 142d of the cylindrical portion 142 of the movable power piston 14.

As seen in FIG. 9, the annular projection 141c is provided with two communicating paths 14e, 14e positioned diametrically opposite one another. The communicating paths 14e, 14e provide constant communication of the second space 14b with the third space 30.

By virtue of the construction of the vacuum servo unit 1 as described above, since the two first spaces 14a, 14a, i.e., the two vacuum paths 14c are disposed in the movable power piston 14, atmospheric air in the front variable pressure chamber and the rear variable pressure chamber 4d can smoothly flow into the constant pressure chambers 4a, 4c when the variable pressure chambers 4b, 4d are communicated with the constant pressure chambers 4a, 4c.

Additionally, in the initial state shown in FIG. 6, the first spaces 14a, 14a communicate with the clearance between the outer peripheral portion of the input side portion of the input member 23 and the projections 141c, 14d (i.e., the second space 14b) through the clearance between the seal portion 22a and the projections 141c, 141d. Thus, the front constant pressure chamber communicates with the rear variable pressure chamber 4d through the vacuum path 14c, the first spaces 14a, 14a, the second space 14b, and the air path 14d. The third space 30 communicates with the front constant pressure chamber 4a through the clearance between the seal portion 22a and the annular projection 141c, the first spaces 14a, 14a, and the vacuum path 14c. Further, the third space 30 communicates with the second space 14b through the clearance between the annular projection 141d and the seat portion 22a, and the communicating paths 14e, 14e. Thus, the third space 30 generates or is under negative pressure.

When the brake pedal 81 is actuated by the driver, the biasing force of the second spring 21 causes the seal portion 22a of the control valve 22 to also move towards the left with the input member 23 according to the movement of the input member 23. The seal portion 22a thus contacts the projections 141c, 141d serving as a negative pressure controlling valve seat, and this cuts off communication between the first spaces 14a, 14a and the second space 14b (i.e., communication between the rear variable pressure chamber 4d and the front constant pressure chamber 4a ceases) and cuts off communication between the third space 30 and the first spaces 14a, 14a (i.e., communication between the third space 30 and the front constant pressure chamber 4a ceases). Therefore, communication between the variable pressure chambers 4b, 4d and the negative pressure source, and communication between the third space 30 and the negative pressure source are cut off.

As the input member 23 moves further towards the left in FIG. 6, the engagement between the atmosphere controlling valve seat 23a and the seal portion 22a ceases so that the second space 14b communicates with the atmosphere. That is, the rear variable pressure chamber 4d communicates with the atmosphere through the air path 14d, the clearance between the outer peripheral portion of the input side portion of the input member 23 and the projections 141c, 141d (i.e, the second space 14b), the clearance between the atmosphere controlling valve seat 23a and the seal portion 22a, and the inside space 142c of the cylindrical portion 142 of the movable power piston 14. The third space 30 communicates with the second space 14b only through the communicating paths 14e, 14e, so that the third space 30 communicates with the atmosphere. Therefore, a pressure differential is generated between the constant pressure chambers 4a, 4c and the variable pressure chambers 4b, 4d by the inflow of atmospheric air into the variable pressure chambers 4b, 4d. Additionally, atmospheric air is introduced into the third space 30.

A pressure differential between the third space 30 and the first spaces 14a, 14a is generated by the inflow of atmospheric air into the third space 30 so that the seal portion 22a of the control valve 22 is biased towards the left in FIG. 6 with the assistance of the atmospheric air in the third space 30. Thus, the seal portion 22a is biased by the second spring 21 and the atmospheric air in the third space 30.

Since the seal portion 22a is biased with the assistance of the atmospheric air in the third space 30, it is advantageously possible to decrease the biasing force of the second spring 21. By decreasing the biasing force of the second spring 21, it is possible to decrease the biasing force of the first spring 24, which means that the depression force applied to the brake pedal 81 by the driver can be decreased. On the other hand, if the biasing force of the second spring 21 is not decreased, the seal force between the projections 141c, 141d and the seal portion 22a can be increased.

By virtue of the construction of the vacuum servo unit 1 described above, several desirable results can be realized. First, atmospheric air is able to smoothly flow into the variable pressure chambers 4b, 4d. Also, atmospheric air in the variable pressure chambers 4b, 4d can smoothly flow into the constant pressure chambers. Further, the depression force applied to the brake pedal can be decreased or the seal force can be increased. The other advantages and results are similar to those in the first embodiment.

In the second embodiment mentioned above, the vacuum servo unit is described in the context of a tandem-type vacuum servo unit, but needless to say, the same advantages can be achieved through use of the invention in a single-type vacuum servo unit.

Figure 10:
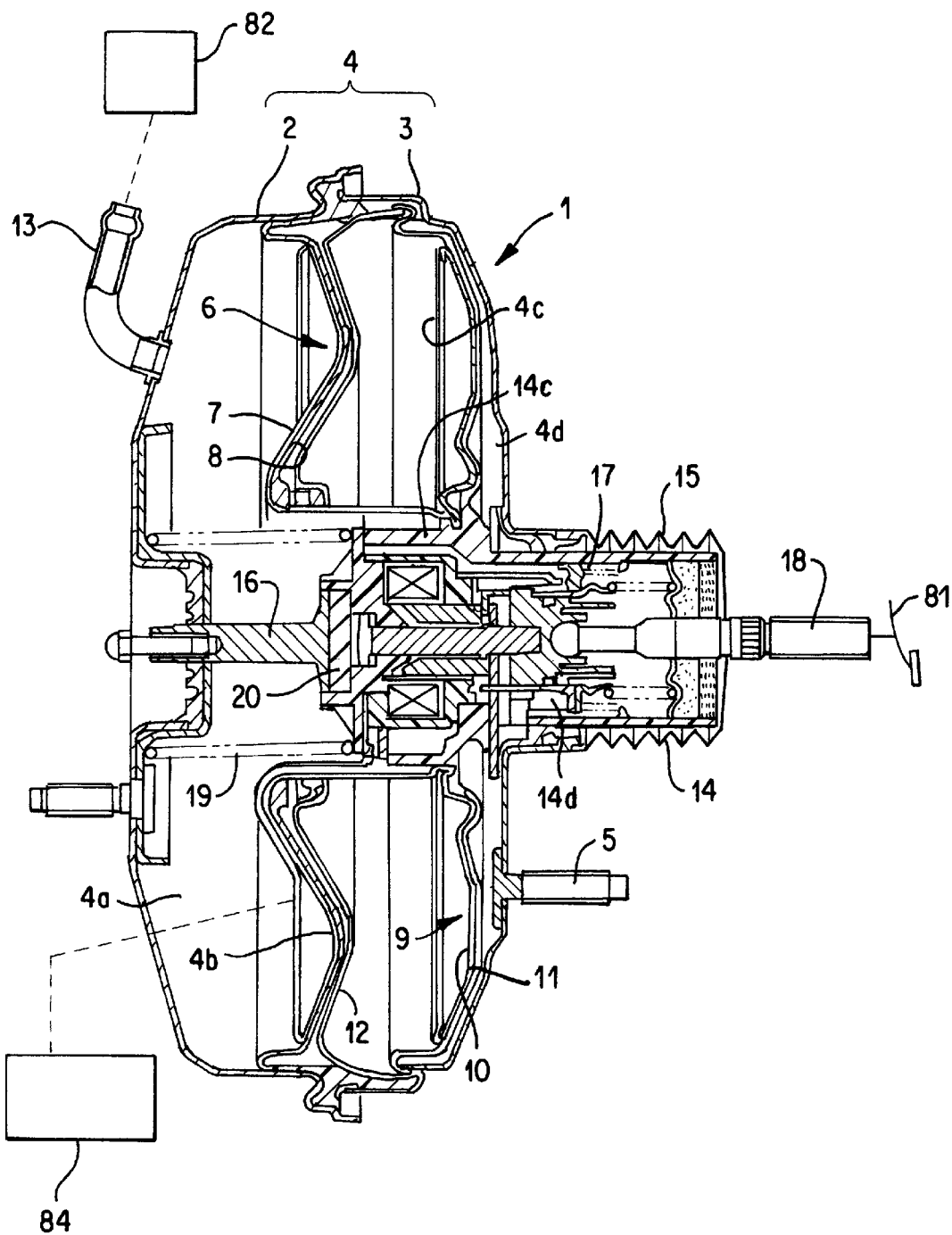
FIG. 10 is a cross-sectional view of a vacuum servo unit according to a third embodiment of the present invention.

FIG. 10 illustrates a third embodiment of the present invention in which elements similar to those in the first embodiment are identified with the same reference numerals. The following description focuses primarily on the differences with respect to the first embodiment.

Referring to FIGS. 10–14, a control valve mechanism 17 comprises a control valve 22, projections 141c, 141d serving, as a negative pressure controlling valve seat, and an atmosphere controlling valve seat 23a. A movable power piston 14 possesses a base portion 141 and a cylindrical portion 142 whose output side end portion 142a is connected to an input side end portion 141b of the base portion 141.

The control valve 22 is disposed in the cylindrical portion 142 and has an annular seal portion 22a, a cylindrical extensible portion 22b whose output side end portion 22ba is connected to the inner peripheral portion 22aa of the annular seal portion 22a, and an engaging portion 22c which is connected to the input side end portion 22bb of the cylindrical extensible portion 22b. The engaging portion 22c is secured to the inner peripheral portion 142d of the cylindrical portion 142 by a support member 83 so that the control valve 22 is secured in the cylindrical portion 142. A second spring 21 is disposed between the seal portion 22a and the support member 83 to bias the seal portion 22a towards the output side, i.e., towards the projections 141c, 141d and towards the left in FIG. 11.

An input member 23 is disposed in the base portion 141 of the movable power piston 14. The input member 23 is comprised of a first plunger portion 231 and a second plunger portion 232. The first plunger portion 231 includes a movable core 231a and a valve portion 231b. The second plunger portion 232 includes an output portion 232a and an input portion 232b. The first plunger portion 231 is in air tight engagement with the input portion 232b, i.e., the second plunger portion 232, at the inner peripheral portion of the valve portion 231b through a seal member, and is movable relative to the second plunger 232.

A spring 26 is disposed between the input portion 232b and an inner flange portion formed at the input side end portion of the valve portion 231b. A radially outwardly extending flange portion is formed at the output portion 232a and is in engagement with a shoulder portion formed in the movable core 231a. The valve portion 231b is provided with an atmosphere valve seat 23a.

An input rod 18 whose an input end portion is connected with a brake pedal 81, is located in the movable power piston 14. The input rod 18 is connected with the input portion 232b of the second plunger portion 232 at an output side end portion thereof.

An electric solenoid 27 and a solenoid case 28 are disposed around the input member 23 in the base portion 141. The electric solenoid 27 is connected to an electric power source 84 of the vehicle by a cord 27a and is adapted to generate an electric magnetic force by the supply of electric power from the electric power source 84 through the cord 27a. A reaction disc retainer 29 is disposed between the reaction disc 20 and the movable power piston 14.

Figure 13:
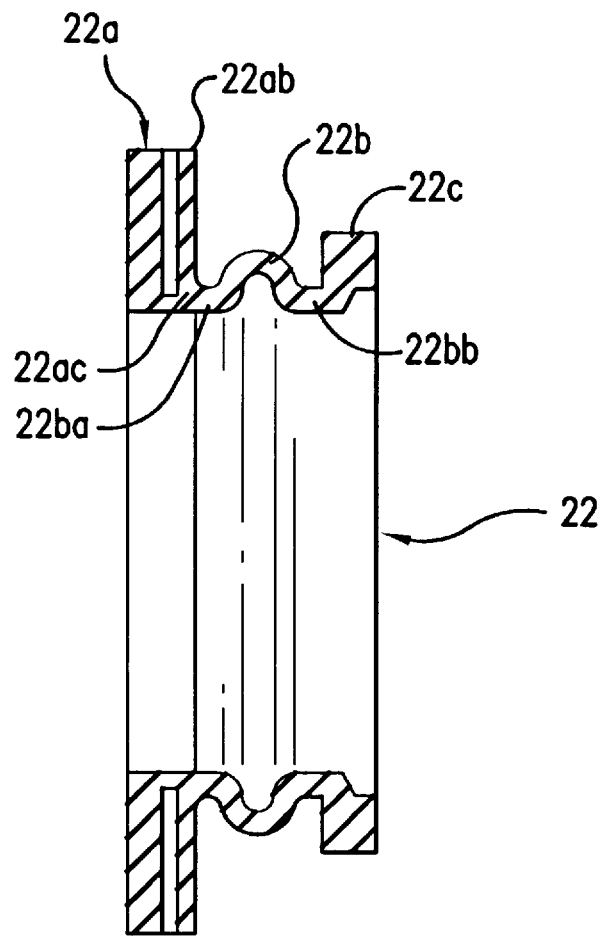
FIG. 13 is a partly enlarged cross-sectional view of the control valve shown in FIG. 11.
Figure 14:
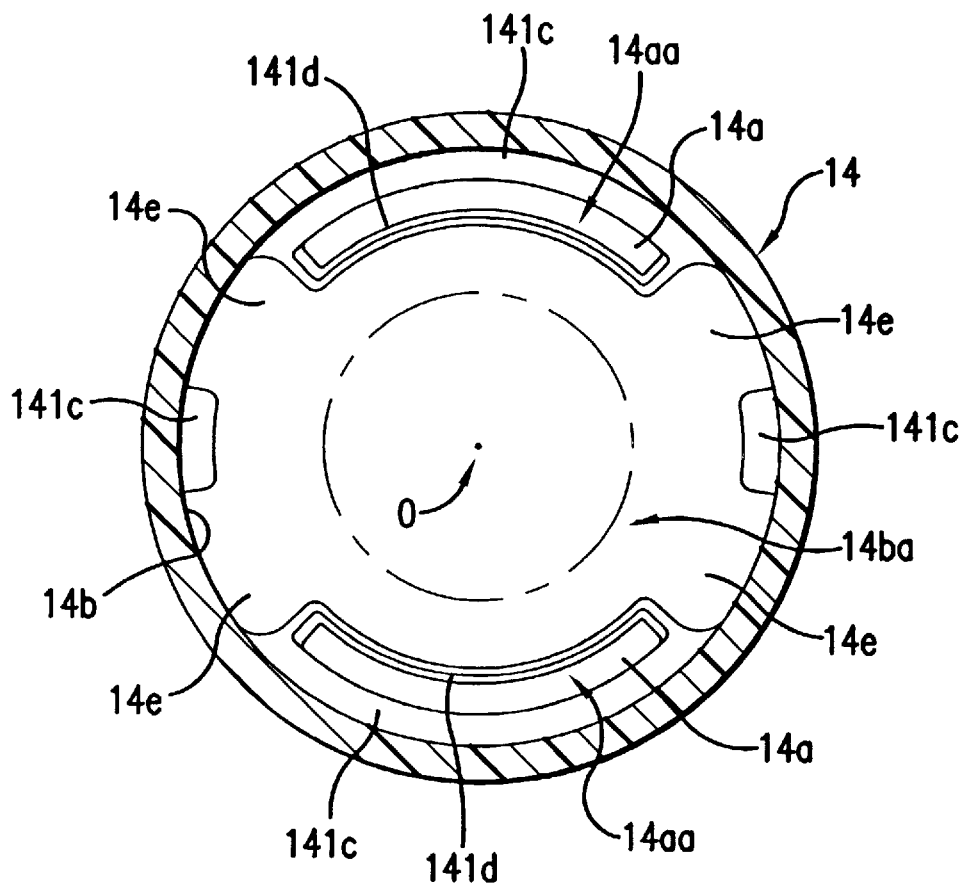
FIG. 14 is a cross-sectional view of the movable power piston along the section line XIV—XIV in FIG. 11 and FIG. 12.

FIG. 14 shows a cross-section of the movable power piston 14 in a plane perpendicular to the axis of the movable power piston 14. In FIG. 14, the one dot chain line shows a contacting portion of the atmosphere controlling valve seat 23a against the seal portion 22a. Referring to FIGS. 10–14, the base portion 141 of the movable power piston 14 has an annular projection 141c projecting into an inside space 142c of the cylindrical portion 142 and two projections 141d, 141d projecting into the inside space 142c. The two projections 141d, 141d divide the space surrounded by the annular projection 141c into two first spaces 14a, 14a and a second space 14b. Disposed in the base portion 141 are several vacuum paths 14c, one of which is shown in FIG. 12, for communicating the front constant pressure chamber 4a with the first spaces 14a, 14a and an air path 14d for communicating the rear variable pressure chamber 4d with the second space 14b.

The cross-sections 14aa, 14aa of the first spaces 14a, 14 in a plane perpendicular to the axis of the movable power piston 14 are in the form of an arc having a center O corresponding to the axis of the movable power piston 14. The area of the section 14ba of the second space 14b in the plane perpendicular to the axis of the movable power piston 14 is larger than the total area of the sections 14aa, 14aa of the first spaces 14a, 14a. Also, the annular extent of each of the first spaces 14a, 14a, and indeed the combined annular extent of the first spaces 14a, 14a, is less than the annular extent of the second space 14b.

The first spaces 14a, 14a are positioned opposite to the seat portion 22a. The two first spaces 14a, 14a are located to be symmetric with respect to the center O.

Figure 11:
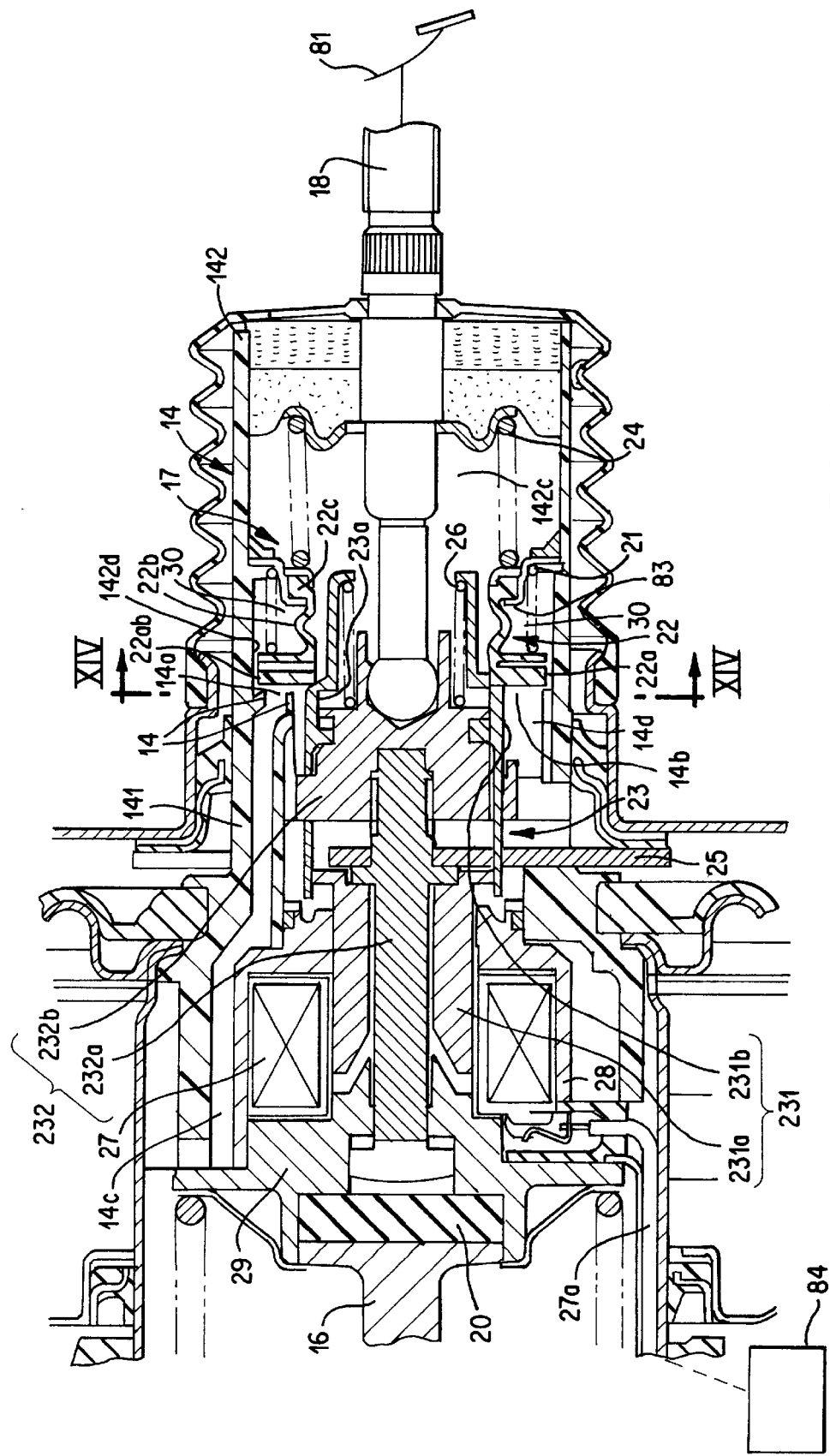
FIG. 11 is a partly cross-sectional view of the portion of the vacuum servo unit shown in FIG. 10 located near the control valve mechanism.
Figure 12:
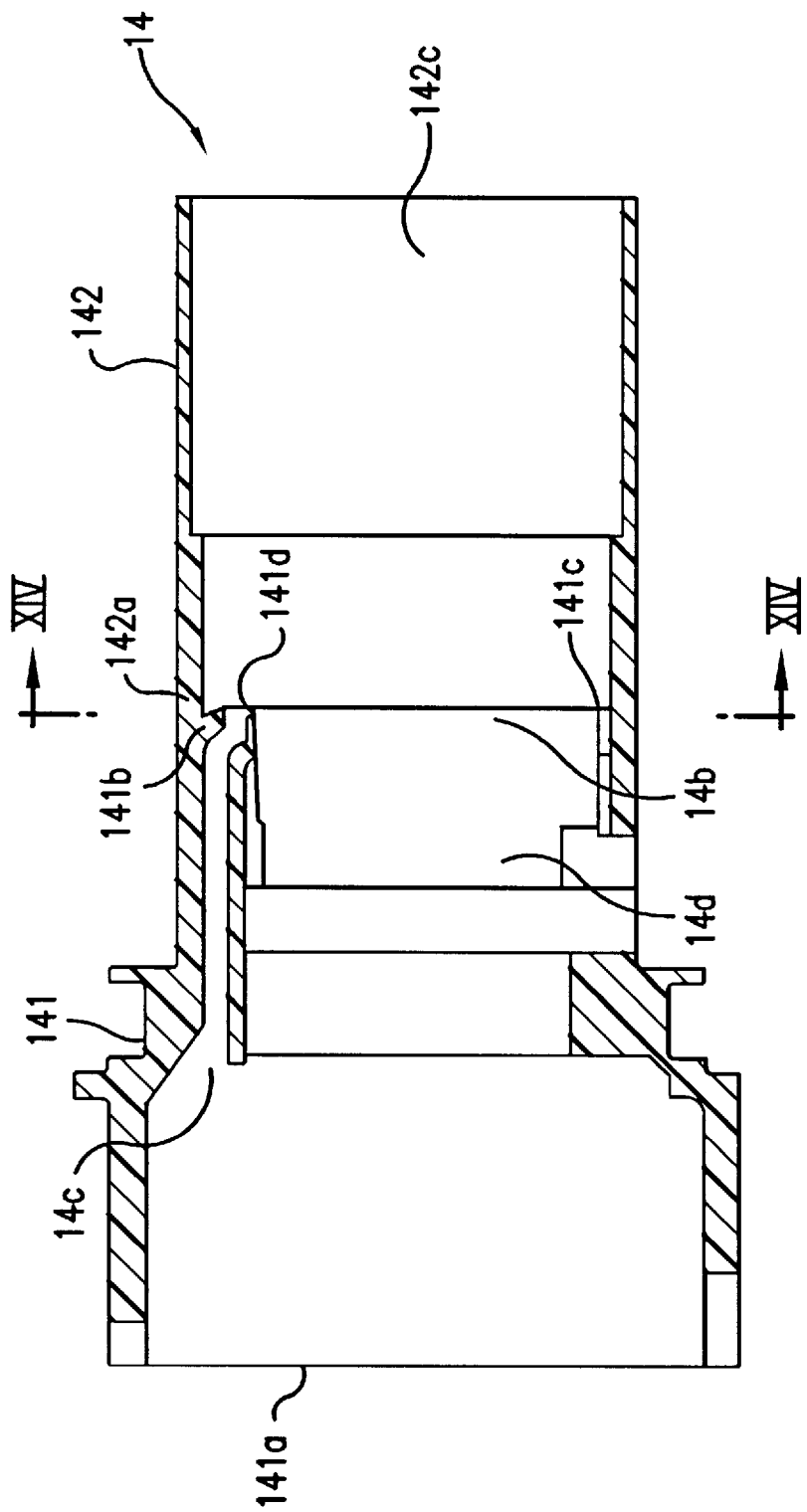
FIG. 12 is a partly enlarged cross-sectional view of the movable power piston used in the vacuum servo unit illustrated in FIG. 10.

In FIGS. 11–13, a clearance is provided between an outer peripheral end portion 22ab of the seal portion 22a and an inner peripheral portion 142d of the cylindrical portion 142. A third space 30 is formed between the outer peripheral portion of the control valve 22 and the inner peripheral portion 142d of the cylindrical portion 142 of the movable power piston 14.

As shown in FIGS. 11–14, the annular projection 141c has four communicating paths 14e, 14e, 14e, 14e. The communicating paths 14e, 14e, 14e, 14e constantly communicate the second space 14b with the third space 30.

This third embodiment of the vacuum servo unit 1 is adapted to effect normal operation through operation of the brake pedal 81 as in the first embodiment and to effect an automatic operation by the electric solenoid 27. The normal operation is substantially the same as the operation in the first embodiment and so an explanation of the normal operation is omitted.

In the case where a need for urgent brake operation arises such as when the existence of an obstacle is detected by the picture disposal of a CCD camera or by a distance measuring sensor, the solenoid 27 is supplied with electric power from the electric power source 84 apart from the brake operation by the driver. The solenoid 27 supplied with the electric power generates an electromagnetic force to make the first plunger portion 231 move toward the left side in FIG. 11 against the biasing force of the spring 26.

The seal portion 22a of the control valve 22 move with the first plunger portion 231 towards the left by the biasing force of the second spring 21 according to the movement of the first plunger portion 231. The seal portion 22a contacts the projections 141c, 141d serving as a negative pressure controlling valve seat, which cuts off communication between the first spaces 14a, 14a and the second space 14b so that communication between the variable pressure chambers 4b, 4d and the constant pressure chambers 4a, 4c is cut off. Therefore, communication between the variable pressure chambers 4b, 4d and the negative pressure source 82 is cut off.

As the first plunger portion 231 moves further towards the left in FIG. 11, the engagement between the atmosphere controlling valve seat 23a and the seal portion 22a ceases so that the second space 14c communicates with the atmosphere. In this way, the variable pressure chambers 4b, 4d communicate with the atmosphere through the air path 14c, the clearance between the outer peripheral portion of the input side portion of the input member 23 and the projections 141c, 141d (i.e., the second space 14b), the clearance between the atmosphere controlling valve seat 23a and the seal portion 22a, and the inside space 142a of the cylindrical portion 142. Therefore, a pressure differential is generated between the constant pressure chambers 4a, 4c and the variable pressure chambers 4b, 4d. The movable wall members 6, 9 receive the load force created by the pressure differential and the movable power piston 14 connected with the movable wall member 6, 9 supplies the amplified brake force to the output rod 16 through the reaction disc 20. The output rod 16 outputs a propulsion force generated by the movable power piston 14, i.e., the amplified brake force is supplied to outside the vacuum servo unit 1.

When it is determined that there is no longer a need for the brake operation and the brake pedal 81 is returned, a sensor (not shown) detects the returning operation of the brake pedal 81, which stops the supply of electric power from the electric power source 82 to the solenoid 27. Thus, the solenoid 27 does not generate the electromagnetic force to the first plunger portion 231, and the first plunger portion 231 is returned towards the right in FIG. 11 by the biasing force of the spring 26. The atmosphere controlling valve seat 23a contacts the seal portion 22a, which cuts off communication between the second space 14c and the atmosphere. That is, communication between the variable pressure chambers 4b, 4d and the atmosphere ceases. As the first plunger portion 231 moves further towards the right, the seal portion 22a of the control valve 22 is pushed by the first plunger portion 231 to move towards the right in cooperation with the first plunger portion 231. Accordingly, the seal portion 22a brakes away from the projections 141c, 141d to effect communication between the first spaces 14a, 14a and the second space 141). Thus, the variable pressure chambers 4b, 4d communicate with the constant pressure chambers 4a, 4c. The atmospheric air in the variable pressure chambers 4b, 4d flows into the constant pressure chambers 4a, 4c. Therefore, the degree of aggressive pressure in the variable pressure chambers 4b, 4d decreases and the servo force to the movable power piston 11 decreases so the operation of the vacuum servo unit 1 comes back to the normal brake operation state.

In addition, in the initial state shown in FIG. 11, the first spaces 14a, 14a communicate with the clearance between the outer peripheral portion of the input side portion of the input member 23 and the projections 141c, 141d (i.e., the second space 14b) through the clearance between the seal portion 22a and the projections 141c, 141d. Thus, the front constant pressure chamber 4a communications with the rear variable pressure chamber 4d through the vacuum path 14c, the first spaces 14a, 14a, the second space 14b, and the air path 14d. The third space 30 communicates with the front constant pressure chamber 4a through the clearance between the seal portion 22a and the annular projection 141c, the first spaces 14a, 14a, and the vacuum paths 14b. The third space 30 also communicates with the second space 14b through the clearance between the annular projection 141c and the seal portion 22a and the communicating paths 14e, 14e. Thus, the third space 30 generates or is under negative pressure.

When the brake pedal 81 or the solenoid 27 is actuated, the seal portion 22a of the control valve 22 moves with the first plunger portion 231 towards the left by the biasing force of the second spring 21 according to the movement of the first plunger portion 231. The seal portion 22a contacts the projections 141c, 141d as a negative pressure controlling valve seat, which cuts off the communication between the first spaces 14a, 14a and the second space 14 (i.e., the communication between the rear variable pressure chamber 4d and the front constant pressure chamber 4a ceases) as well as communication between the third space 30 and the first spaces 14a, 14a (i.e., the communication between the third space 30 and the front constant pressure chamber 4a is cu off). Therefore, the communication between the variable pressure chambers 4b, 4d and the negative pressure source 82, and the communication between the third space 30 and the negative pressure source 82 are cut off.

As the first plunger portion 231 moves further towards the left in FIG. 11, the engagement between the atmosphere controlling valve seat 23a and the seal portion 22a ceases, so that the second space 14b communicates with the atmosphere (i.e., the rear variable pressure chamber 4d communicates with the atmosphere) through the air path 14c, the clearance between the outer peripheral portion of the input member 23 and the projections 141c, 141d (i.e., the second space 14b), the clearance between the atmosphere controlling valve seat 23a and the seal portion 22a, and the inside space 142c of the cylindrical portion 142. The third space 30 communicates with the second space 14b only through the communicating paths 14e, 14e, and the third space 30 communicates with the atmosphere. Therefore, a pressure differential is generated between the constant pressure chambers 4a, 4c and the variable pressure chambers 4b, 4d by the inflow of atmospheric air into the variable pressure chambers 4b, 4d. The atmospheric air is also introduced into the third space 30.

A pressure differential between the third space 30 and the first spaces 14a, 14a is generated by the inflow of atmospheric air into the third space 30 so that the seal portion 22a of the control valve 22 is biased towards the left in FIG. 11 by the atmospheric air in the third space 30. Thus, the seal portion 22a is biased by the second spring 21 and the atmospheric air in the third space 30.

The seal portion 22a is biased by the atmospheric air in the third space 30 so that it is possible to decrease the biasing force of the second spring 21. By decreasing the biasing force of the second spring 21, it is possible to decrease the biasing force of the first spring 24, which means that the depression force applied to the brake pedal 81 by the driver can be reduced. On the other hand, if the decrease of the biasing force of the second spring 21 is not carried out, the seal force between the projections 141c, 141d and the seat portion 22a can be increased.

By virtue of the construction of the vacuum servo unit 1 as described above, atmospheric air can smoothly flow into the variable pressure chambers 4b, 4d, and atmospheric air in the variable pressure chambers 4b, 4d can smoothly flow into the constant pressure chambers 4a, 4c. Further, the depression force applied to the brake pedal can be decreased or the seal force can be increased. Other advantages and results associated with the above-described vacuum servo unit are similar to those in the first embodiment.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vacuum servo unit for a vehicle braking system comprising:

a housing in which is defined a pressure chamber;

a movable wall member disposed in said housing for dividing said pressure chamber into a constant pressure chamber communicable with a negative pressure source and a variable pressure chamber selectively communicable with atmosphere and said constant pressure chamber;

a movable power piston connected with said movable wall member, said movable power piston having a base portion and a cylindrical portion, the cylindrical portion having an output side end portion connected to an input side end portion of said base portion, said base portion of the movable power piston having an annular first projection projecting into an interior space within the cylindrical portion and a non-annular second projection projecting into the interior space of the cylindrical portion, said second projection dividing a space surrounded by said annular first projection into a first space and a second space;

a vacuum path communicating said first space with said constant pressure chamber;

an air path communicating said second space with said variable pressure chamber;

an input member disposed in said base portion and axially movable upon brake actuation;

an output member outputting a propulsion force generated by said movable power piston according to movement of said movable wall member; and a control member disposed in said cylindrical portion, said control member being cooperable with said first and second projections and said input member to selectively communicate said second space with said first space or with the atmosphere according to movement of said input member with respect to said movable power piston.

2. A vacuum servo unit as claimed in claim 1, including a third space formed between an inner periphery of said movable power piston and an outer periphery of said control member, said annular projection being provided with a communicating path which constantly communicates said second space with said third space.

3. A vacuum servo unit as claimed in claim 2, wherein said control member has an annular seal portion for contacting said annular first projection and said second projection.

4. A vacuum servo unit as claimed in claim 1, wherein said movable power piston possesses an axis, said first space having a cross-sectional area in a plane perpendicular to the axis of said movable power piston that is less than the cross-sectional area of said second space in said plane.

5. A vacuum servo unit as claimed in claim 1, including a first spring operatively associated with said input member for biasing said input member towards an input side, and a second spring operatively associated with said control member for biasing said control member towards said first and second projections, said input member including an input rod for being connected to a brake operation member.

6. A vacuum servo unit as claimed in claim 1, wherein said movable power piston possesses an axis, said first space being shaped as an arc as viewed in cross-section in a plane perpendicular to the axis of said movable power piston that, the arc having a center coincident with the axis of said movable power piston.

7. A vacuum servo unit as claimed in claim 1, wherein said base portion of the movable power piston includes another second projection projecting into the interior space of the cylindrical portion so that the space surrounded by said annular first projection is divided into two first spaces and a second space.

8. A vacuum servo unit for a vehicle braking system comprising:

a housing in which is defined a pressure chamber;

a movable wall member disposed in said housing for dividing said pressure chamber into a constant pressure chamber communicable with a negative pressure source and a variable pressure chamber selectively communicable with atmosphere and said constant pressure chamber;

a movable power piston connected with said movable wall member, said movable power piston having an axis;

a negative pressure controlling valve seat defining within the movable power piston a first space and a second space, said first space being separate from said second space and having an extent less than that of the second space, said first space having a cross-sectional area in a plane perpendicular to the axis of said movable power piston that is less than the cross-sectional area of said second space in said plane;

a vacuum path communicating said first space with said constant pressure chamber;

an air path communicating said second space with said variable pressure chamber;

an input member disposed in said movable power piston and axially movable upon brake actuation;

an output member outputting a propulsion force generated by said movable power piston according to movement of said movable wall member; and a control member disposed in said movable power piston, said control member being selectively engageable with and disengageable from said negative pressure controlling valve seat during axial movement of the input member with respect to the movable power piston to communicate said variable pressure chamber with said constant pressure chamber by way of the first and second spaces when said control member is out of engagement with said negative pressure controlling valve seat and to cease communication between said constant pressure chamber and said variable pressure chamber while communicating the variable pressure chamber with the atmosphere by way of the second space when said control member is in engagement with said negative pressure controlling valve seat.

9. A vacuum servo unit as claimed in claim 8, including a third space formed between an inner periphery of said movable power piston and an outer periphery of said control member, said movable power piston being provided with a communicating path which constantly communicates said second space with said third space.

10. A vacuum servo unit as claimed in claim 8, wherein said negative pressure controlling valve seat includes an annular first projection projecting into an interior space within the movable power piston and at least one second projection projecting into the interior space within the movable power piston.

11. A vacuum servo unit as claimed in claim 8, wherein said movable power piston possesses an axis, said first space being shaped as an arc as viewed in cross-section in a plane perpendicular to the axis of said movable power piston that, the arc having a center coincident with the axis of said movable power piston.

12. A vacuum servo unit as claimed in claim 8, wherein said negative pressure controlling valve seat includes a first projection and a pair of second projections projecting into an interior space within the movable power piston.

13. A vacuum servo unit for a vehicle braking system comprising:

a housing in which is defined a pressure chamber;

a movable wall member disposed in said housing for dividing said pressure chamber into a constant pressure chamber communicable with a negative pressure source and a variable pressure chamber selectively communicable with atmosphere and said constant pressure chamber;

a movable power piston connected with said movable wall member, said movable power piston having an inner peripheral surface;

a negative pressure controlling valve seat disposed in the movable power piston, said negative pressure controlling valve seat dividing a space within the movable power piston into a first space and a second space;

a vacuum path communicating said first space with said constant pressure chamber;

an air path communicating said second space with said variable pressure chamber;

an input member disposed in said base portion and axially movable upon brake actuation;

an output member outputting a propulsion force generated by said movable power piston according to movement of said movable wall member; and a control member disposed in said cylindrical portion for cooperating with said negative pressure controlling valve seat to selectively communicate said second space with said first space or with the atmosphere according to movement of said input member with respect to said movable power piston;

a third space formed between an inner periphery of said movable power piston and an outer periphery of said control member; and a communicating portion directly formed in said movable power piston which constantly communicates said second space with said third space.

14. A vacuum servo unit as claimed in claim 13, wherein said movable power piston possesses an axis, said first space having a cross-sectional area in a plane perpendicular to the axis of said movable power piston that is less than the cross-sectional area of said second space in said plane.

15. A vacuum servo unit as claimed in claim 13, wherein said negative pressure controlling valve seat includes an annular first projection and at least one second projection projecting into an interior space within the movable power piston.

16. A vacuum servo unit as claimed in claim 13, wherein said movable power piston possesses an axis, said first space being shaped as an arc as viewed in cross-section in a plane perpendicular to the axis of said movable power piston that, the arc having a center coincident with the axis of said movable power piston.

17. A vacuum servo unit as claimed in claim 13, wherein said negative pressure controlling valve seat includes an annular first projection projecting into an interior space within the movable power piston and a pair of second projections projecting into the interior space within the movable power piston.

* * * * *